United States Patent [19]
Hansen, Jr. et al.

[11] Patent Number: 5,701,927
[45] Date of Patent: Dec. 30, 1997

[54] INTERCHANGEABLE AUTOMATIC CONTROL VALVE

[75] Inventors: Louis J. Hansen, Jr., El Macero;
Luciano J. Maligad, Jr., Elk Grove;
Douglas H. Powell, El Macero, all of Calif.

[73] Assignee: Hunter Innovations, Sacramento, Calif.

[21] Appl. No.: 557,495

[22] Filed: Nov. 20, 1995

[51] Int. Cl.⁶ .................................................. F16K 31/12
[52] U.S. Cl. ................................ 137/271; 137/505.41
[58] Field of Search .............................. 137/269, 271, 137/505.41; 251/331

[56] References Cited

U.S. PATENT DOCUMENTS

| | | | |
|---|---|---|---|
| 2,871,879 | 2/1959 | Downe et al. | 137/505.41 X |
| 3,016,065 | 1/1962 | Stampfli | 137/271 X |
| 3,747,629 | 7/1973 | Bauman | 137/505.41 X |
| 3,938,542 | 2/1976 | Bolha | 137/271 |

*Primary Examiner*—Kevin Lee
*Attorney, Agent, or Firm*—Mark C. Jacobs, Esq.

[57] ABSTRACT

A valve actuator for an automatic fluid control valve actuator which fits an Ames Company predetermined size valve housing and which is also suitable for use in a Cla-Val automatic fluid control valve housing of the same predetermined size and which valve actuator is interchangeable with the actuator of each respective manufacturer. The valve actuators range from 4 inches up to 12 inches and can be used as the original actuator of a set size within the range in either manufacturer's housing. The actuator includes a main body disposed on a shaft with a diaphragm and a diaphragm disk plate adjacent the main body on the shaft, all of which are retained by nuts threadedly engaged to the shaft.

16 Claims, 3 Drawing Sheets

INTERCHANGEABLE AUTOMATIC CONTROL VALVE

FIELD OF THE INVENTION

This invention pertains to elements utilized in a fluid control valve.

BACKGROUND OF THE INVENTION

Valves and fittings are used in conjunction with pipe lines to control the flow of fluids, such as water, oil, gas et cetera. Some of the industries which utilize pipe lines include, but are not limited to, petrochemicals, plumbing, water treatment, mining, fire protection and many more. Among the specific uses of automatic control valves are pressure reduction, liquid level control, and pressure relief.

Just as Ford car parts will not fit a Chevrolet made by General Motors, so too the valve parts of one manufacturer will not fit the valve of a second manufacturer. Today Ames Company, Inc. of Woodland, Calif. and Cla-Val Co. of Newport Beach, Calif. are two of the industry leaders in the automatic valve business. Not only does each company's particular size valve housing have a different appearance from the competitor, but the interior metal parts are not interchangeable.

It is an object of this invention to define an automatic valve actuator that can be used in the same size valve made by either Ames Company or Cla-Val Co.

It is another object to provide an interchangeable valve actuator for 4 inch, 6 inch, 8 inch and larger diameter valves of the two leading valve manufacturers.

It is yet another object to provide a valve actuator that requires no welded valve body or casting components It is a further object to provide a valve actuator for an automatic valve that is easier and cheaper to produce than those of the prior art.

Other objects of the invention will in part be obvious and will in part appear hereinafter.

The invention accordingly comprises the device possessing the features properties and the relation of components which are exemplified in the following detailed disclosure and the scope of the application of which will be indicated in the appended claims.

For a fuller understanding of the nature and objects of the invention reference should be made to the following detailed description, taken in conjunction with the accompanying drawings.

SUMMARY OF THE INVENTION

A valve actuator for an automatic fluid control valve actuator which fits an Ames Company predetermined size valve housing and which is also suitable for use in a Cla-Val Co. automatic fluid control valve housing of the same predetermined size.

DESCRIPTION OF THE PREFERRED EMBODIMENT

Figure 1:
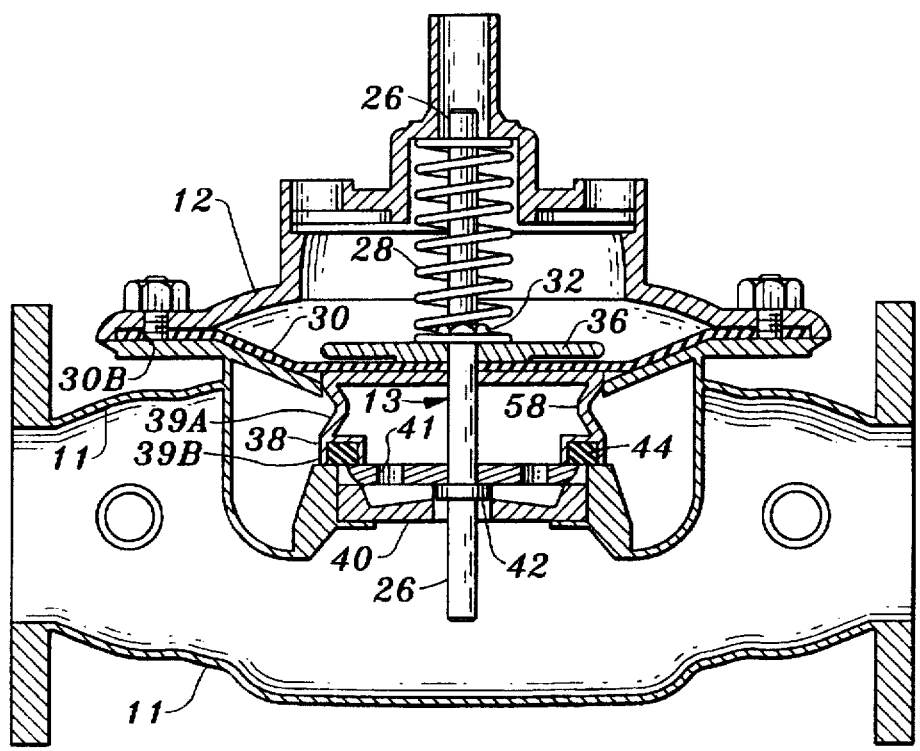
FIG. 1 is a sectional view of an Ames automatic control valve. (Prior Art)
Figure 5:
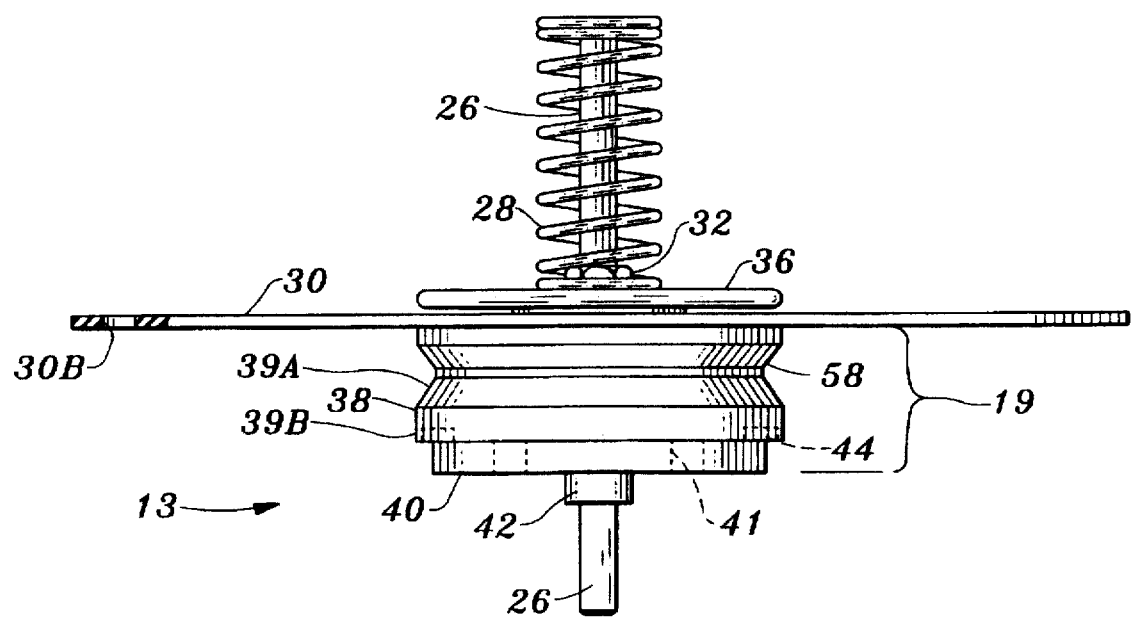
FIG. 5 is a diagrammatic elevational view of a PRIOR art valve actuator.

In FIGS. 1 and 5 there is shown a complete Ames Company valve of a finite size and the actuator part thereof which is also seen in FIG. 1 is shown in more detail in FIG. 5. In this application a valve shall be deemed to comprise a valve housing and the valve actuator. The invention of this application is seen to be a newly defined actuator that is adapted to fit into the housing of the Ames Company, Inc. as well as the housing of the Cla-Val Company.

To render the situation easier for the reader to understand, the prior art actuator labeled as such and shown in FIG. 5 will be discussed element by element as will be the device of this invention.

In FIG. 1 an Ames Company valve is shown in full. Here the valve 10 is seen to include a main body 11, and a cover 12. The actuator designated 13 and all of its components are also seen. Note, however, that element 38, the disc holder is shown in cutaway in FIG. 1. All of the individual components of actuator 13 are more readily understood by reference to FIG. 5 where each of the components identified in the working environment of FIG. 1 is also seen but with more detail.

The reader is therefore urged to also refer to FIG. 5 for a brief description of the various components of the prior art actuator to better appreciate the development of the device of this invention.

Thus shaft 26 has disposed thereon a coil spring 28. A jam nut 32 serves to retain members in disposition the shaft 26. Just beneath the nut 32, is an upper diaphragm support plate 36, often made of stainless steel in view of the operating environment of the device. Disposed on the shaft beneath the upper plate 36, is a diaphragm, 30, which has a series of bores 30B therein disposed around the periphery of the diaphragm at suitable locations for the receipt of bolts not shown.

A disc holder 38 is disposed just beneath the diaphragm. This unit includes a pipe bell or pipe connection first member 39A, connected as by welding to a ring receiving disk member 39B. A recess is found in the underside that receives a rubber annular member 44. Overlying the central area of the underside of the receiving disk is a bottom plate 40. All of these elements are held in place by a threaded nut 42 threadingly engaged to threads on shaft 28 located distant from the spring 28. Or in the alternative element 42 can be a section of a greater diameter machined during the manufacture of the shaft and integral thereto.

In view of the fact that element 38 is welded to element, a potentially sealed area would be formed, which would be subject to pressure changes. In order to bleed pressure from within the volume of disk holder 38, a throughbore 41 is drilled upwardly to communicate to the interior of disk holder 38. Shaft 26 has a thickened section 42 that serves as a stop upon which all of the aforementioned elements rest.

This valve actuator, noted earlier, is made by Ames for the Ames housing and fits only the Ames housing.

Figure 2:
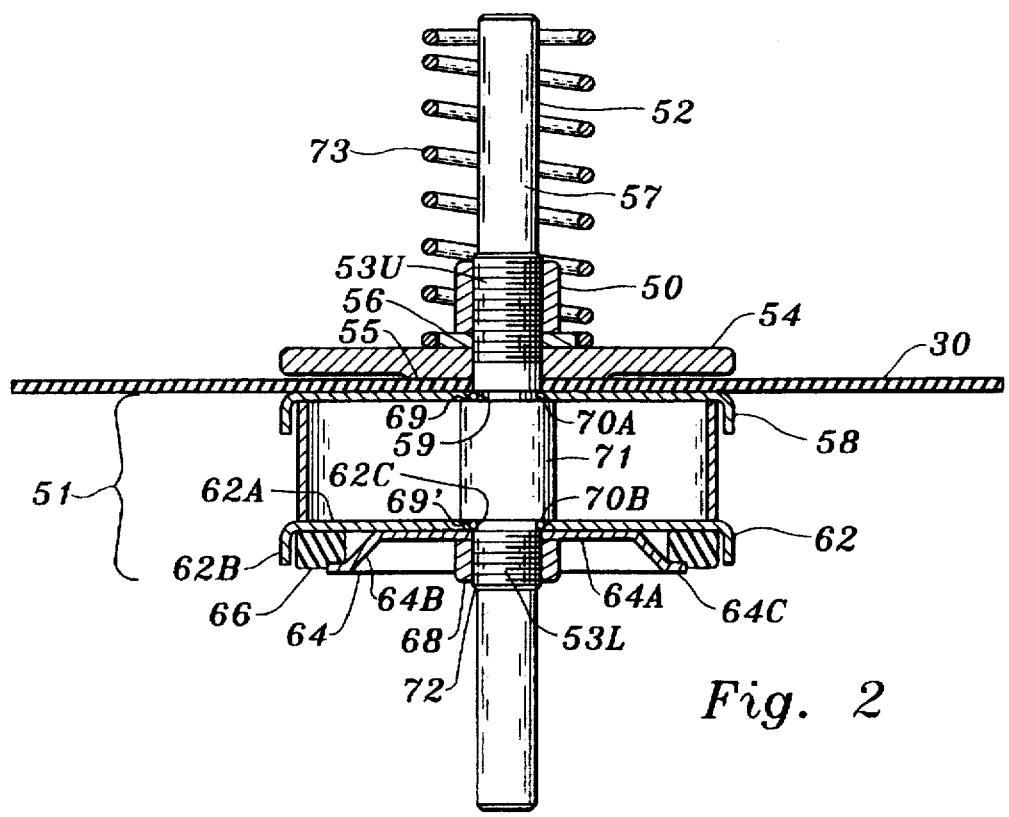
FIG. 2 is a diagrammatic sectional view of the valve actuator of this invention.
Figure 3:
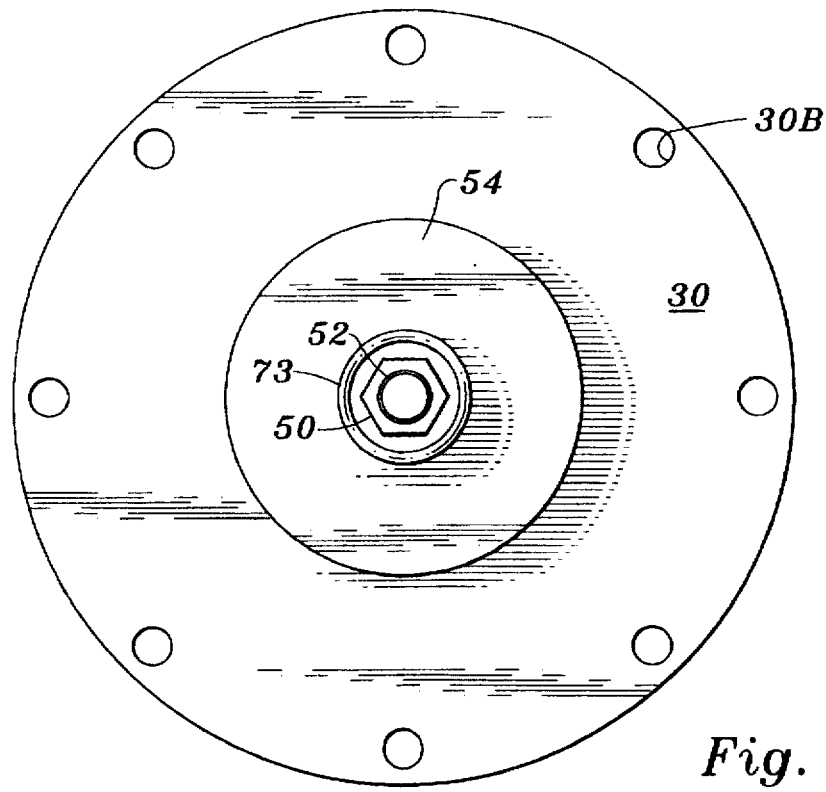
FIG. 3 is a top plan view of the actuator is this invention.
Figure 4:
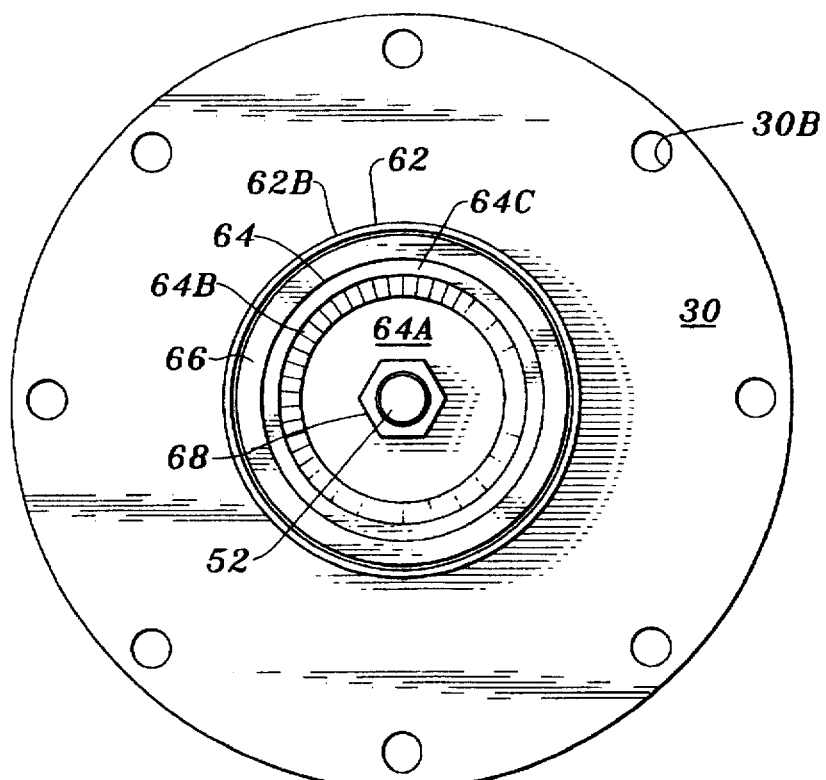
FIG. 4 is a bottom plan view thereof.

The reader's attention is now turned to FIG. 2 wherein there is depicted the value actuator of this invention. This unit includes a shaft 52 of a slightly shorter elevation than the Ames shaft 26. This shaft has a portion of a first cross section 57 and an intermediate portion of a second cross section 71. Spaced down from the top of the shaft are a set of upper threads 53U. A jam nut 50 is threadingly engaged onto said threads 53U. Disposed beneath the nut is a conventional lockwasher 56. Positioned beneath the lockwasher is a diaphragm disk plate 54 with a center opening sized to be slightly greater in diameter than the shaft, and formed preferably of stainless steel. Disk plate 54 includes a slightly thickened in elevation central zone 55 which serves as a reduced annular sealing area for improved compressive sealing for diaphragm 30 disposed there beneath. This diaphragm is the same Buna-N diaphragm shown in FIG. 3 as having a plurality of spaced bolt apertures therein.

As one moves down the shaft there is found a shoulder 69, which is the point of commencement of a slightly greater diameter elongated section 71 of the shaft 52. An O-ring 70A is positioned on the shaft at the interface 69 of the thickened portion 71 with the narrower portion 57 of the shaft 52. The main body 51 of this invention rests on the shoulder 69. The term main body is meant to describe that section of the actuator valve which is below the diaphragm and does not include the shaft. Note the main body 19 of the Ames unit in FIG. 5 which is similarly defined.

Flange plate 58 has a central opening 59 sized to fit over the thicker portion 71, of the shaft, such that the plate rests on the shoulder with the O-ring 70A interposed between the edge of the opening and this the first flange plate. Note the placement with the flange here shown in a downwardly disposition.

An annular member 60, made preferably of stainless steel, is sized to fit within the interior of the flange pan adjacent the flange of the first flange plate, but not necessarily in an airtight relationship.

A second O-ring and a second flange plate 62 are mounted in like fashion at the other shoulder 69' of the thickened portion 71 of the shaft. The second flange plate is seen to have a first flat section 62, with a central bore 62C therein, and a downward depending lip 62B, and said plate is to be placed in the same disposition as the first such plate, whereby the annular member 60 rests on the top side of this plate, rather than within the interior thereof, i.e., inside the lip as with the first flange plate. See FIG. 2.

A diverging pie plate 64 which has a main centrally bored horizontal surface 64A, which surface extends outwardly a lesser distance from the shaft's thickened section than does the second flange plate. Extending downwardly and outwardly around the circumference of the first horizontal surface is an intermediate second portion 64B. From the distal terminus of this extends a horizontal lip 64C around the entire periphery. Since the second flange plate is retained by an O-ring, no O-ring need be used with the pie pan plate.

A hard rubber (polyurethane) seat ring 66 is placed adjacent the flange of the second flange plate, and it also rests on the horizontal lip 64C. From the point of view of assembly, the rubber disk is inserted prior to the placement of the pie pan plate, 64 onto the thickened section of the shaft.

A jam nut 68 is tightened onto threads 53L, which threads are disposed on the thickened portion of the shaft at the lower end thereof, 72. This is in contrast to the location of threads 53U which are located on the main portion of the shaft 52. Note further the location of the jam nut. This is located within the confines of the pie pan such that only a very small portion is exposed as opposed to the prior art unit wherein the total nut is disposed below the lowest positioned plate. Such a disposition of the jam nut 68 serves to alter the operating length of the shaft.

The spring 73 shown on the shaft 52 forms no part of this invention directly, but rather is employed in connection with the actuation of the device of this invention. Such actuation is similar to that as shown in FIG. 1 where a spring 28 is shown disposed on the shaft 13.

It is to be noted that since the fit of the various components of this invention is not airtight, there is no need for a throughbore into the interior of the annular member 60 to bleed the pressure and so none is present. This is in contrast to the Ames unit which has a large welded unit and does possess a bleed hole as noted earlier herein.

This valve actuator, like others before it, depends on the variance and control of pressure above and below the diaphragm. The spring creates a pressure differential from the inlet to the outlet thus providing a self-contained hydraulic control of the opening/closing and pressure regulating operations of this valve. Such actuation is well known to the art of automatic control valves.

The valve actuators of this invention can be made in 4 inch, 6 inch, 8 inch, 10 inch and even larger diameters for the diaphragm.

BENEFITS

Whereas the main body 19, of the prior art valve actuator is fabricated from cut materials and then welded together, the instant valve actuator's main body 51 uses formed stainless steel components for the main body. This mode of construction provides an easier and cheaper to build valve actuator with improved flow characteristics.

Other benefits of the instant device aside from the interchangeability include lower assembly time, the lack of need for a welding shop either in-house or outsourced, reduced time devoted to the machining of parts and lower shipping charges due to a lesser weight.

Reference to the drawings indicates that the total elevation of the shaft of this invention is insignificantly shorter than is the shaft of the Ames prior art unit in total length. However, when the Ames unit's shaft was cut to lower its overall elevation, whether it was cut at the top, cut at the bottom, or cut at both, it was still found that the Ames actuator would not function in a similarly sized Cla-Val valve housing. In addition, shortening of the shaft alone of the Ames unit renders it incapable of operation in the Ames valve housing.

The reader should note that the distance from the lower end of the shaft to the lower end of the nut or stop of the two units is different in that the elevation here is about 2.25 inches versus 3.00 inches for the Ames prior art shaft. Thus while the overall length of the two shafts is substantially the same, the "operating length" is different.

Particular reference should now be again made to FIGS. 1 and 2. It is seen that the total elevation of the main body 19, of the prior art 6" unit is about 2.75 inches above the stop or nut 42, while the elevation of the applicant's device for an 6" unit is only about 1.875 inches above the portion of the jam nut 82 that is seen in a side elevational view.

The reader's attention is drawn to the fact that the total elevation of the main body of the prior art AMES unit is about 3.50 inches, for a six-inch diameter valve whereas by using formed parts, the elevation of the main body is only about 3.2 inches.

It is believed that by positioning the jam nut 62 in what could be designated a recessed manner within the pie pan 64 the effective elevation of the main body can be shortened. It is further believed that this feature in conjunction with the difference in thickness of the AMES plate 40 which is about 5/16ths inch thick versus applicant's pie pan having a thickness of about 1/8th inch, all together serve to permit the interchangeability of the same actuator into the valve housing of both Ames and Cla-Val.

It must be understood that the valve industry is one that has been in existence for over 100 years, yet progress and new technology advances are slow to take hold. Applicants believe that the valve actuator of this invention is the first application of the use of formed parts, i.e., precision die stampings in the manufacture of valve actuators. Ames, Cla-Val and others in the industry all use heavy cast iron parts that are machined down to the operational tolerances needed. This is the way it has always been done.

But by recognizing that a different technology can be adapted to the valve actuator manufacture, applicants have been able to produce a better, cheaper to make, more long lasting and more reliable valve actuator than has ever been done before. And, in addition they have made it interchangeable between the valve housings of two different vendors.

Because the industry leaders all use cast iron parts it is necessary to replace components periodically due to water induced rust and corrosion. But by providing stainless steel formed parts for the plates, and the annular member, this industry problem of short time duration replacement is overcome.

Since certain changes may be made in the described apparatus without departing from the scope of the invention herein involved, it is intended that all matter contained in the above description and shown in the accompanying drawings shall be interpreted as illustrative and not in a limiting sense.

I claim:

1. An interchangeable fluid control valve actuator which actuator comprises:
    a. a shaft having two sets of spaced apart threads thereon, the first of which sets is spaced down from the top of said shaft, and the second of said sets is spaced up from the bottom of said shaft,
    b. a diaphragm disk plate havding a center opening is disposed on said shaft immediately below the first set of threads,
    c. a diaphragm having a central opening therein is disposed on said shaft beneath said diaphragm disk plate,
    d. a main body which comprises first and second flange plates, the second of which has a flat section, and a turned-down lip and said main body further includes a diverging pie plate comprising a centrally bored horizontal surface and a horizontal lip attached to said plate,
    said main body being disposed on said shaft beneath said diaphragm, and
    e. a seat ring disposed between the turned-down lip of said second flange plate and the horizontal lip of said diverging pie plate, and
    f. a pair of nuts, one threadedly engaged with each of the first and second sets of threads on said shaft to retain all of the aforesaid elements on said shaft.

2. In the actuator of claim 1 wherein the diaphragm includes a plurality of bolt receiving apertures spaced around the periphery of the diaphragm, each of which apertures is substantially equidistant from the center of the diaphragm.

3. In the actuator of claim 1 wherein the disk plate includes a central zone having a slightly thickened elevation, which central zone is disposed adjacent the diaphragm.

4. In the actuator of claim 1 wherein the main body comprises first and second spaced flange plates each of which has a central bore, and each of which has a turned down lip, with an annular member disposed therebetween.

5. In the actuator of claim 1 wherein the shaft has a thickened section that serves as a stop upon which can rest the main body.

6. In the actuator of claim 4 wherein an O-ring is disposed between the central bore of each flange plate and the shaft.

7. In the actuator of claim 5 wherein the thickened section is elongated and an O-ring is disposed on said shaft at the commencement of the thickened section and at the end of the thickened section.

8. In the actuator of claim 5, wherein the central bore of each of the spaced flange plates of the main body has a diameter less than that of the thickened section of the shaft.

9. In the actuator of claim 1 wherein the seat ring is a polyurethane ring.

10. In the actuator of claim 4 wherein each of the two spaced flange plates have the same diameter, and the annular member is disposed within the turned lip of the first of said flange plates.

11. In the actuator of claim 1 wherein the main body is made of individually formed stainless steel components.

12. An interchangeable automatic fluid control valve, valve actuator adapted to operate in the same diameter valve's housing as made by two different manufacturers, which actuator comprises:
    a. a shaft having two sets of spaced apart threads thereon, the first of said sets is spaced down from the top of said shaft, and the second of which sets is spaced up from the bottom of said shaft,
    b. a diaphragm disk plate having a center opening is disposed on said shaft immediately below the first set of threads,
    c. a diaphragm having a central opening therein is disposed on said shaft beneath said diaphragm disk plate,
    d. a main body of an associated vertically disposed series of components, which are abutted one against another, said main body comprises first and second spaced flange plates each of which has a central bore and each of which is of the same diameter, and each of which has a turned down lip, with an annular member disposed therebetween and within the turned down lip of the first of said flange plates, said main body being disposed beneath said diaphragm on said shaft,
    e. a seat ring disposed between the turned-down lip of said second flange plate and a retention means for said seat ring, and
    f. a pair of nuts threadedly engaged, one with the first and one with the second set of threads on said shaft to retain all of the aforesaid elements on said shaft.

13. In the actuator of claim 12 wherein the retention means for said seat ring is the horizontal lip of a diverging pie plate having a horizontal lip.

14. In the actuator of claim 13 wherein the disk plate includes a central zone having a slightly thickened elevation, which central zone is disposed adjacent the diaphragm and said diaphragm includes a plurality of spaced bolt receiving apertures.

15. In the actuator of claim 14 further including O-rings interposed between each of said first and second flange plates and the shaft.

16. In the actuator of claim 12 wherein the main body is made of individually formed stainless steel components.

* * * * *